United States Patent
Singh et al.

(10) Patent No.: US 12,301,288 B2
(45) Date of Patent: *May 13, 2025

(54) METHODS FOR CAPACITY PROVISIONING IN WIDE AREA NETWORKS USING OPTICAL BYPASSING

(71) Applicant: Microsoft Technology Licensing, LLC, Redmond, WA (US)

(72) Inventors: Rachee Singh, Redmond, WA (US); Nikolaj S. Bjorner, Woodinville, WA (US); Yawei Yin, Redmond, WA (US); John Frederick Arnold, Snohomish, WA (US); Jamie Gaudette, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/142,978

(22) Filed: May 3, 2023

(65) Prior Publication Data

US 2023/0275666 A1 Aug. 31, 2023

Related U.S. Application Data

(63) Continuation of application No. 17/728,571, filed on Apr. 25, 2022, now abandoned, which is a continuation of application No. 17/219,734, filed on Mar. 31, 2021, now Pat. No. 11,342,996.

(51) Int. Cl.
*H04B 10/27* (2013.01)
*H04B 10/25* (2013.01)
*H04Q 11/00* (2006.01)

(52) U.S. Cl.
CPC ......... *H04B 10/27* (2013.01); *H04B 10/2589* (2020.05); *H04Q 11/0005* (2013.01); *H04Q 11/0062* (2013.01); *H04Q 2011/0081* (2013.01); *H04Q 2011/0086* (2013.01); *H04Q 2011/009* (2013.01)

(58) Field of Classification Search
CPC .................................................... H04B 10/27
See application file for complete search history.

(56) References Cited

U.S. PATENT DOCUMENTS

| | | | |
|---|---|---|---|
| 6,711,152 B1 * | 3/2004 | Kalmanek, Jr. | H04L 45/04 370/351 |
| 11,342,996 B1 * | 5/2022 | Singh | H04Q 11/0062 |
| 2019/0319847 A1 * | 10/2019 | Nahar | G06F 9/45558 |
| 2021/0385292 A1 * | 12/2021 | Lowe | H04L 63/08 |

* cited by examiner

*Primary Examiner* — Shi K Li

(57) ABSTRACT

Systems and methods are provided for determining an optical bypass for an inter-regional wide area network (WAN) for regions of server facilities of a cloud service provider. In particular, the optical bypass connects non-adjacent regional server centers of the WAN by eliminating needs of data conversions at intermediate regional server centers. The determining the optical bypass includes receiving a WAN topology data, capacity and demand information about the WAN. The determining includes an objective function to maximize a number of network resources to free up by determining a revised data flow and bandwidth allocations by introducing the optical bypass in the WAN. The disclosed technology transmits the determined data traffic flow and resource allocation information of the optical bypass, causing a network traffic enforcers to reconfigure the WAN.

20 Claims, 10 Drawing Sheets

Input 502:

- $G<V, E>$: network $G$, vertices $V$ and edges $E$;
- $c_e$: capacity of edge $e$;
- $u_e$: capacity of one wavelength of edge $e$;
- $D_d$: traffic demand between $src_d$ and $dst_d$;
- $T_d$: set of tunnels for demand $d$;
- $s$: network shortcut due to optical bypass;
- $u_s$: capacity of one wavelength of shortcut $s$;

Output 504:

- $flow_t \in R_{\geq 0}$   flow allocated over tunnel $t$
- $x^t_e \in R_{\geq 0}$   flow allocation on edge $e$ for tunnel $t$
- $w_s \in N$   number of wavelengths on shortcut $s$
- $y^t_s \in R_{\geq 0}$   flow allocation on shortcut $s$ for $t$ Computation 506:

Maximize: $\sum_s |s| * w_s$ subject to:

(1) $D_d \leq \sum_{t \in T_d} flow_t,$   $\forall d \in D$
(2) $0 \leq x^t_e,$   $\forall t \in T, e \in t$
(3) $0 \leq y^t_s,$   $\forall t \in T, e \in t$
(4) $flow_t \leq x^t_e + \sum_{t \in e} y^t_s,$   $\forall t \in T, e \in t$
(5) $\sum_{t \in e} y^t_s \leq u_s * w_s,$   $\forall s$
(6) $x_e := \sum_{t \in e} x^t_e,$   $\forall e$
(7) $x_e + u_e * \sum_{s \in e} w_s \leq c_e,$   $\forall e$
(8) $w_s = w_{vector(s)},$   $\forall s$

FIG. 5

METHODS FOR CAPACITY PROVISIONING IN WIDE AREA NETWORKS USING OPTICAL BYPASSING

CROSS-REFERENCE TO RELATED APPLICATIONS

This application is a continuation of U.S. patent application Ser. No. 17/728,571, filed Apr. 25, 2022, which is a continuation of U.S. patent application Ser. No. 17/219,734, filed Mar. 31, 2021, now U.S. Pat. No. 11,342,996, the contents of which are incorporated herein by reference.

BACKGROUND

Demand for data traffic capacity across broad geographic regions has rapidly increased as use of cloud services has become common place. Cloud providers rely on a network infrastructure of various resources to meet this demand. For instance, a backbone of a cloud provider includes long-haul network segments that connect regional server centers. These long-haul network segments facilitate inter-regional data traffic. For example, a long-haul network segment includes a point-to-point optical fiber connection between two regional server centers. In contrast, intra-regional networks include electrical domains where electrical wires facilitate data traffic. Transponders at the ends of the point-to-point fiber connections provide optical-to-electrical and electrical-to-optical signal conversions. Since there is a limit to the distance signals can travel over an optical fiber connection, many regional server centers may be linked across a broad geographic region. In some cases, data traffic originating at one regional server center (e.g., on the east coast of the U.S.) and destined for another regional server center (e.g., on the west coast of the U.S.) may pass through one or more intermediate regional server centers.

Even though transit data traffic is merely passing through, each intermediate regional server center performs an optical-to-electrical-to-optical (OEO) data conversion for the transit data traffic. Since transit data traffic does not terminate at an intermediate server center as a destination, it is unnecessary to convert the signal from optical-to-electrical for transmission in the electrical domain of the intermediate server center. However, the OEO conversion also regenerates the signal carrying the transit data traffic, enabling the signal to travel further on the optical fiber subsequent to the intermediate server center. Thus, with respect to the transit data traffic, the cost of unnecessary OEO data conversion must be balanced against the need for signal regeneration. In practice, this OEO data conversion and allocation of router ports for pass-through data traffic at each intermediate regional server center may result in some unnecessary overhead with respect to network resources. However, extending the optical fiber connection without the OEO data conversion would require one or more amplifiers to amplify the optical signal in the long-haul optical signal communications. Thus, developing a technology that improves resource efficiencies while maintaining performance in data traffic transmission would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by generating an optical bypass in a wide-area network (WAN). The present disclosure relates to determining aspects of an optical bypass between two regional server centers. The aspects include a data flow and bandwidth allocation for the optical bypass. The data flow and bandwidth allocation may be based on network topology, data capacity, and traffic demand information.

The disclosed technology relates to "optical bypasses." The term "optical bypass" may be a tunnel of fiber optics that directly connects one regional server center with another regional server center through an intermediate regional server center without connecting to (i.e., "bypassing") the electrical domain within the intermediate regional server center. To facilitate the optical bypass, at a physical layer of the network, two ends of distinct optical fiber networks may be directly connected. This direct connection eliminates the OEO conversion at the intermediate regional server center. Higher layers of the network stack (e.g., network protocol layers) may also provide a direct connection between the two (source and destination) regional server centers. The term "bandwidth" may be associated with a capacity of a network connection expressed as a number of bits per second, for example. An "optical bandwidth" indicates a bandwidth of an optical fiber network connection. In aspects, the optical bandwidth may also be expressed by a number of wavelengths of optical signals in the optical fiber network connection. In aspects, a modulation format of optical signal processing determines a number of bits per second of data flow per wavelength.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system for generating an optical bypass in accordance to aspects of the present disclosure.

FIGS. 2A-B illustrate examples of an inter-regional WAN and an optical bypass in accordance with aspects of the present disclosure.

FIGS. 3A-C illustrates examples of an optical bypass between two regional server centers in accordance with aspects of the present disclosure.

FIGS. 4A-B illustrate examples of an inter-regional optical network in accordance with aspects of the present disclosure.

FIG. 5 illustrates an example of a method for generating an optical bypass in an inter-regional optical network in accordance with aspects of the present disclosure.

DETAILED DESCRIPTION

Figure 1:
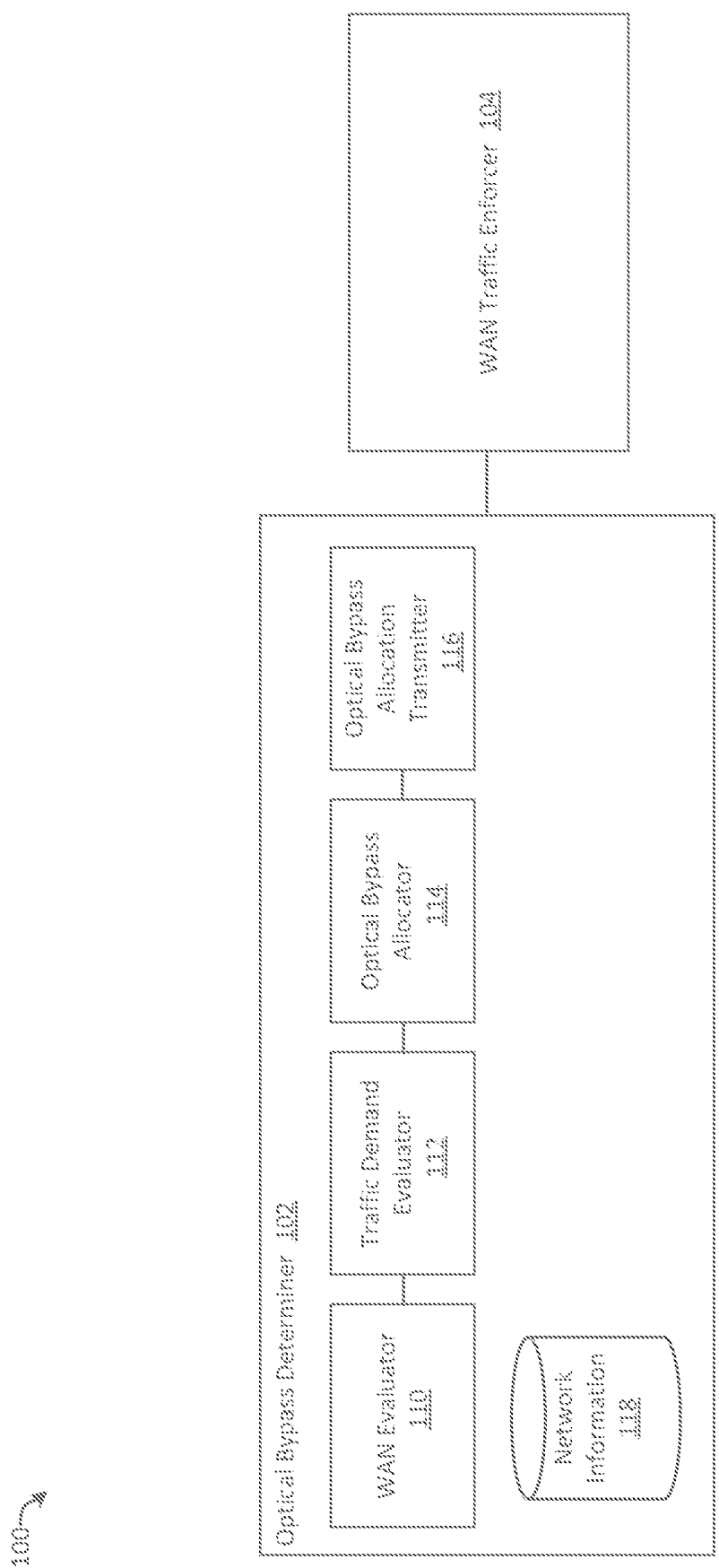

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

A cloud service provider may operate multiple regional server centers to process data in the cloud. An inter-regional backbone WAN connects the regional server centers. The backbone WAN operates in an optical domain, where a point-to-point optical fiber connection links one regional server center to another regional server center. Additionally, each regional server center communicates over an intra-regional network. However, in this case, the intra-regional network is associated with an electrical domain where data traffic passes over electrical wires.

In some aspects, inter-regional data traffic in the backbone WAN may originate at one regional server center and terminate at an adjacent regional server center over an optical fiber connection. In this case, data traffic transmitted between the two adjacent regional server centers is within an optical domain since the data is transmitted over an optical fiber network. In contrast, data traffic within respective regional server centers is transmitted in an electrical domain over electrical wires to respective local area networks (LANs). At the both ends of the optical fiber connection, transponders at respective regional server center transform data traffic between the electronic domain and the optical domain.

In other aspects, inter-regional data traffic may originate at one regional server center and terminate at a non-adjacent regional server center over the same backbone WAN. The inter-regional data traffic between two non-adjacent regional servers passes through one or more intermediate (i.e., transit) regional server centers. An intermediate regional server center in a traditional WAN facilitates the data traffic in transit from one optical fiber connection to another optical fiber connection through a two-stage "optical-to-electrical-to-optical" (OEO) data conversion. In the first stage, a transponder at the intermediate regional server center performs an optical-electrical conversion on the data traffic from the optical fiber connection in the optical domain to the electrical domain associated with the intermediate regional server center network. Second, the transponder further performs an electrical-to-optical conversion on the data traffic in the electrical domain back to the optical domain for transmission over the other optical fiber connection on route to the destination (or terminal) regional server center. In traditional systems, OEO data conversion is implemented because the two optical fiber connections terminate at a terminal and, respectively, connect to a router at the intermediate regional server center. The rerouting of the data traffic in transit takes place at a network layer higher than the physical layer (e.g., an IP layer for routing data based on IP addresses). This OEO data conversion of transit data traffic passing through an intermediate regional server center may result in an inefficient use of network resources, such as router ports and transponder processing.

The present application solves the above issue by configuring optical bypasses at intermediate regional server centers to eliminate the need to perform OEO data conversion for at least some transit data traffic. In particular, the disclosed technology evaluates WAN topology information, network capacity information, and traffic demand information between two non-adjacent regional server centers to identify "tunnels" that may be evaluated as predicted network "shortcuts" for configuring optical bypasses. In aspects, "tunnels" may refer to a pre-computed set of k shortest paths between demand sources and destination regions within the WAN. From the set of tunnels, one or more candidate network shortcuts may be identified. An optical bypass determiner evaluates the candidate network shortcuts based on a combination of WAN topology data and historical traffic demand data, including historical data flow allocations and tunnel capacity for each candidate network shortcuts. Based on this evaluation, one or more candidate network shortcuts may be selected for configuration as optical bypasses between two non-adjacent regional server centers. Once selected and/or determined, configuring optical bypasses enables the system to balance competing demands of ever-increasing inter-regional data traffic and efficient use of network resources. Configuring optical bypasses may include physical changes to optical fiber connections within the WAN infrastructure. Configuring optical bypasses may further cause routers and transponder port settings to be reconfigured at respective regional server centers.

As discussed in more detail below, the present disclosure relates to determining optical bypasses for inter-regional data traffic in a WAN network. In particular, the optical bypass determiner identifies optical bypasses between non-adjacent regional server centers based on WAN network topology and historical data flow allocations, capacity, and traffic demand information.

FIG. 1 illustrates an overview of an example system 100 for determining an optical bypass in a WAN in accordance with aspects of the present disclosure. System 100 represents a system for determining an optical bypass and enforcing WAN data traffic using the optical bypass. System 100 includes an optical bypass determiner 102 and a WAN traffic enforcer 104. The optical bypass determiner 102 determines resource allocations for an optical bypass associated with inter-regional data traffic between two non-adjacent regional server centers. The WAN traffic enforcer 104 enforces the network resource allocations based on the optical bypass determination.

The WAN evaluator 110 may receive various information for evaluating the WAN. First, WAN evaluator 110 may receive network topology information associated with the WAN. The topology information includes an infrastructure map with vertices as regional server centers and edges as optical fiber connections between one or more pairs of the regional server centers. Second, WAN evaluator 110 may receive historical optical bandwidth capacity for respective edges corresponding to respective optical fiber connections. An optical bandwidth capacity of an optical fiber connection may be measured in terms of a number of wavelengths. In aspects, a data transmission bit rate per wavelength of light over the respective optical fiber connections may depend on modulation formats of the optical fiber connections. For example, some optical transponders of the optical fiber connections support three data rates per wavelength of light: 200 Giga bits per second (Gbps), 150 Gbps, and 100 Gbps by modulating the signals in modulation formats of 16-QAM, 8-QAM and QPSK respectively. Optical geographic reaches of respective formats are 800 km, 2,500 km, and 5,000 km.

The traffic demand evaluator 112 may receive historical demand information about inter-regional data traffic. In aspects, the demand information may include a traffic demand between one regional server center as a source and another regional server center as a destination. Traffic demand evaluator 112 may also receive a set of predetermined tunnels between the source and destination, at least one predicted network shortcut to be assessed as an optical bypass, and an optical bandwidth capacity of one wavelength on the network shortcut to be assessed.

The optical bypass allocator 114 may predict optical bypass allocation information. The optical bypass allocator 114 evaluates the topology information of the WAN in view of a combination of the historical bandwidth capacity and the historical demand information for traffic over respective optical fiber connections. In aspects, the optical bypass allocation information evaluated may include one or more of the following four types. First, a historical data flow allocation over a tunnel identified as a network shortcut between two non-adjacent regional server centers may be evaluated. Second, a historical data flow allocation on respective optical fiber connections for the tunnel may be evaluated. Third, a number of wavelengths available on the network shortcut may be determined. Fourth, a data flow allocation for the network shortcut may be predicted. In some aspects, the number of wavelengths for an optical fiber connection translates into an optical bandwidth available for data transmission through the optical fiber connection. The data flow allocation on the network shortcut indicates an amount of data traffic allocated to an optical fiber connection associated with the network shortcut based on the available optical bandwidth. In aspects, the optical bypass allocator 114 may select one or more network shortcuts based on efficiency of network resource allocation and cause the one or more network shortcuts to be configured as one or more optical bypasses for implementation in the WAN.

In aspects, the optical bypass allocator 114 also analyzes and compares usage of network resources associated with the OEO data conversion at intermediate regional server centers. Use of the OEO data conversion may consume network resources such as router ports, optical ports, and transponder processing at the respective intermediate regional server centers. In contrast, while configuring an optical bypass at an intermediate regional server center may conserve the above network resources, additional amplifiers may be needed to maintain the signal strength of the optical signals traveling along long-haul optical fiber connections. Furthermore, configuring at least one tunnel as an optical bypass may reduce a bandwidth capacity of an optical fiber connection between two adjacent regional server centers. Accordingly, the optical bypass allocator 114 strikes a balance between costs of inefficient use of network resources and sufficient capacity over the optical fiber connections in the WAN to meet demand.

The optical bypass allocation transmitter 116 may transmit the optical bypass allocation information to the WAN traffic enforcer 104. In aspects the WAN traffic enforcer 104 configures the WAN to route traffic according to allocated data flows across the network, including allocated data flows across optical bypasses based on the optical bypass allocation information.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2A:
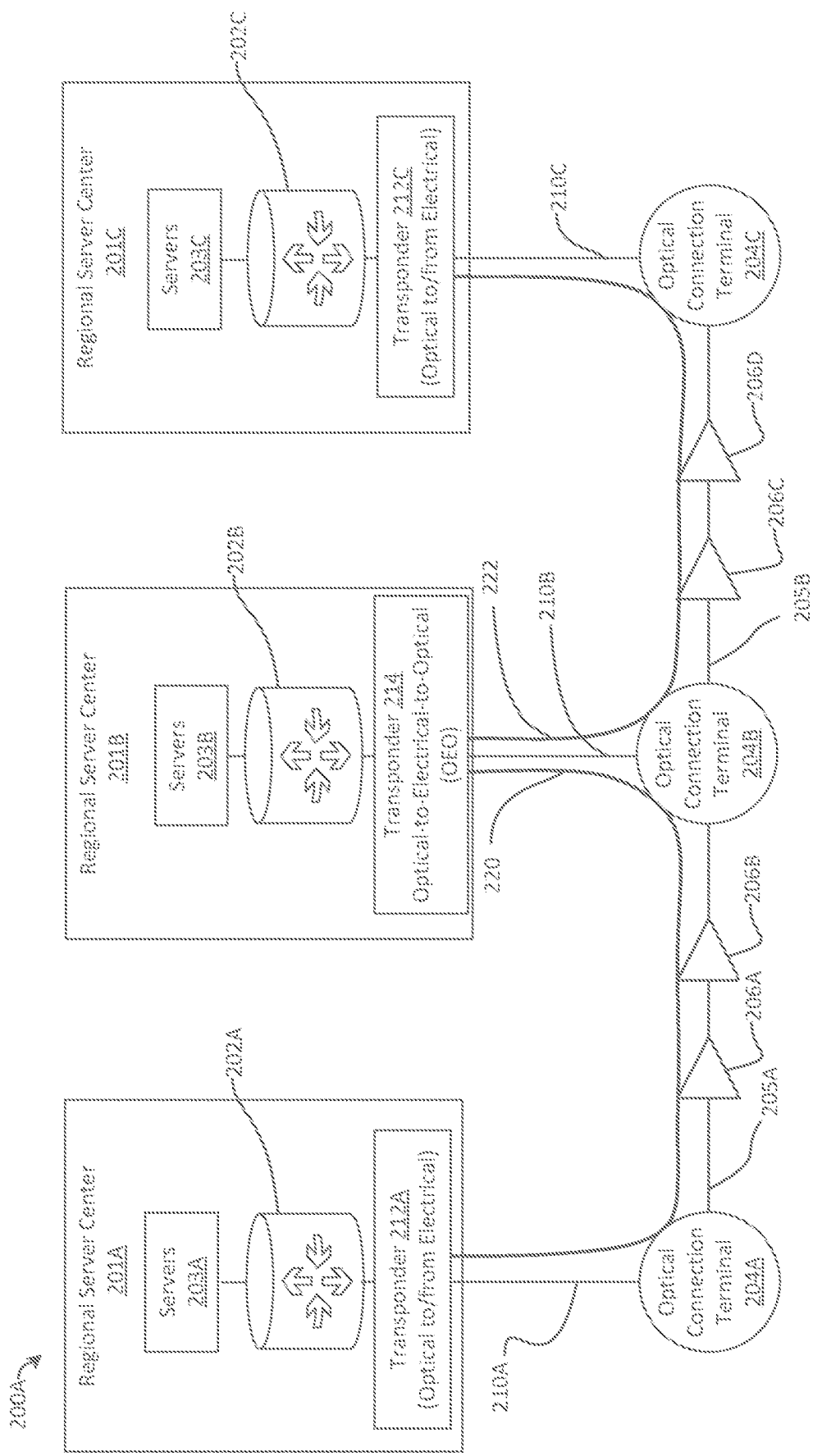
Figure 2B:
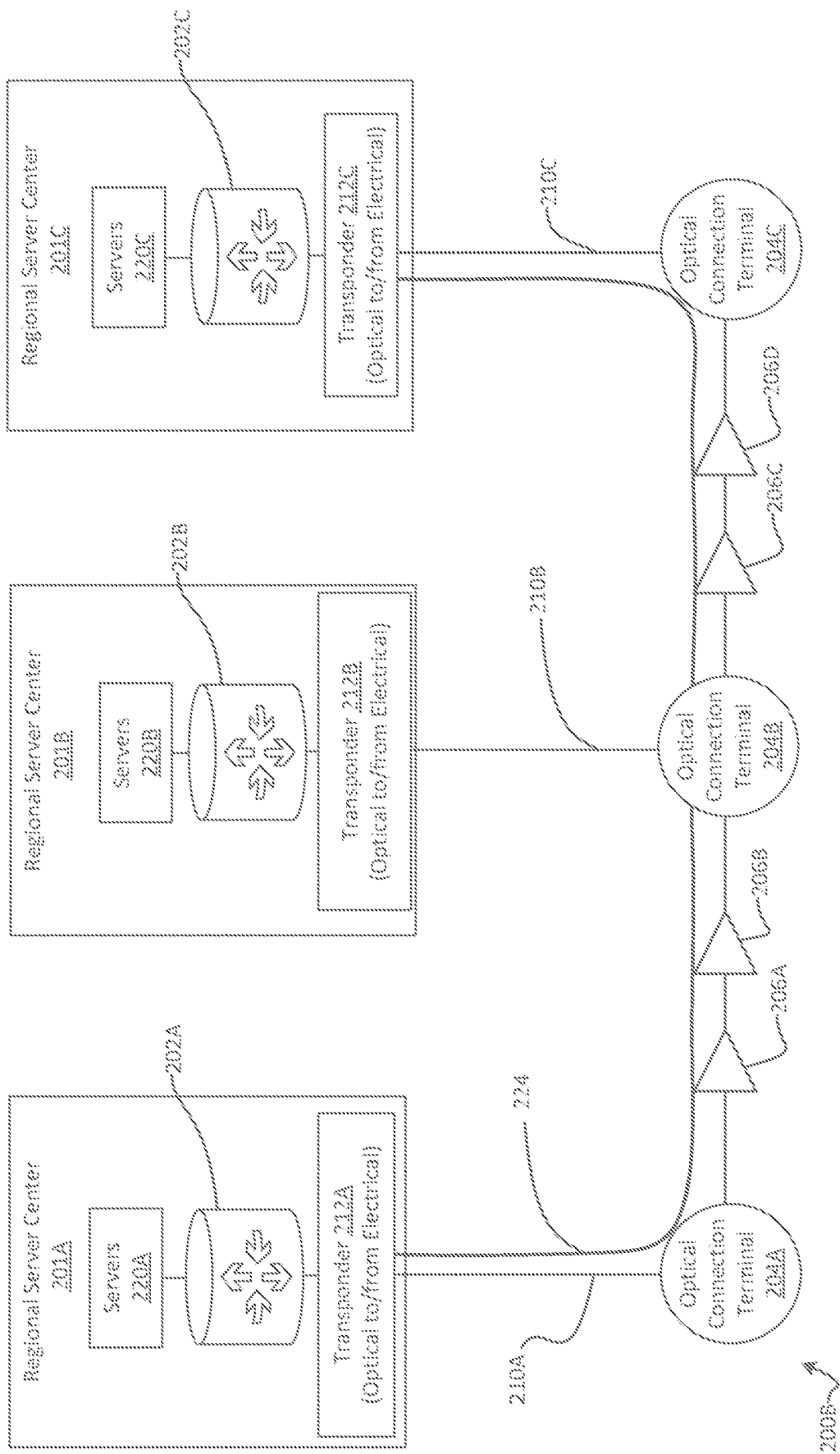

FIGS. 2A-B illustrate examples of an inter-regional WAN and an optical bypass according to the aspects of the present disclosure. FIG. 2A illustrates an example of an inter-regional WAN and two point-to-point optical fiber connections according to aspects of the present disclosure. An inter-regional system 200A includes three regional server centers: a regional server center 201A, a regional server center 201B, and regional server center 201C. The regional server center 201A includes a set of servers 203A for providing aspects of the cloud services in conjunction with other regional servers. The servers 203A connect to a router 202A. The router 202A connects to a transponder 212A (Optical to/from electrical). The transponder 212A (Optical to/from electrical) converts data traffic signals between the optical domain and the electrical domain. Data traffic in the regional server center 201A is in the electrical domain. The line 210A and the line 205A through the optical connection terminal 204A are in the optical domain. The optical connection terminal 204A is an optical terminal. The optical connection terminal includes wavelength selective switches (WSS), multiplexers and de-multiplexers. An optical connection terminal connects optical light channels to router ports. Optical connection terminal 204A connects to the transponder 212A in the regional server center 201A. The line 205A represents an optical fiber connection, which connects between optical connection terminal 204A and optical connection terminal 204B. Amplifier 206A and amplifier 206B respectively amplify optical signals on the line 205A, which represents an optical fiber connection. In aspects, a distance between two amplifiers depends on a modulation format of optical signals. In aspects, optical reaches are 800 km for 16-QAM, 2,500 km for 8-QAM, and 5,000 km for QPSK. The line 205B connects between optical connection terminal 204B and optical connection terminal 204C. The optical fiber connection 220 illustrates a point-to-point optical fiber connection between the regional server center 201A and the regional server center 201B across optical connection terminal 204A and optical connection terminal 204B.

The regional server center 201B includes a set of servers 203B. The set of servers 203B connects to a router 202B. The router 202B connects to a transponder 214 (Optical to electrical to optical (OEO)). The transponder 214 converts between the optical domain and the electrical domain. Data communications in the regional server center 201B corresponds to the electrical domain. The line 210B through the optical connection terminal 204B is in the optical domain. Optical connection terminal 204B is connected by line 205B, which represent an optical fiber connection, to optical connection terminal 204C. Amplifier 206C and amplifier 206D amplify optical signals on the line 205B. The optical fiber connection 222 illustrates a point-to-point optical fiber connection between the regional server center 201B and the regional server center 201C across optical connection terminal 204B and optical connection terminal 204C. The regional server center 201C includes a set of servers 203C.

The set of servers 203C connect to a router 202C. The router 202C connects to a transponder 212C (Optical to/from electrical).

In aspects, an inter-regional data traffic occurs between the regional server center 201A and the regional server center 201C with the regional server center 201B being an intermediate regional server center. The inter-regional data traffic leaves the regional server center 201A and reaches the transponder 214 (OEO) in the regional server center 201B after passing through the optical fiber connection 220. The transponder 214 converts the data traffic in the optical domain into the electrical domain. The router 202B routes the data traffic back toward the optical connection terminal 204B toward the regional server center 201C.

FIG. 2B illustrates an example inter-regional WAN with an optical bypass in accordance with the aspects of the present disclosure. The inter-regional system 200B includes the regional server center 201A, the regional server center 201B, and the regional server center 201A. Each regional server center includes servers (e.g., servers 203A in the regional server center 201A, servers 203B in the regional server center 201B, and servers 200C in the regional server center 201C). The servers connect to routers (e.g., router 202A in the regional server center 201A, router 202B in the regional server center 201B, and router 202C in the regional server center 201C) in the respective regional server centers.

In aspects, the inter-regional system 200B includes an optical bypass between the regional server center 201A and the regional server center 201C, through the regional server center 201B as an intermediate regional server center without the OEO data conversion at the transponder 212B. In contrast to the inter-regional system 200A with the two point-to-point optical fiber connections, the optical fiber connection 224 (i.e., a reconfigured network shortcut) connects between the transponder 212A in the regional server center 201A and the transponder 212C in the regional server center 201C. The optical fiber connection 224 does not consume ports in the router 202B and the transponder 212B in the regional server center 201B.

Figure 3A:
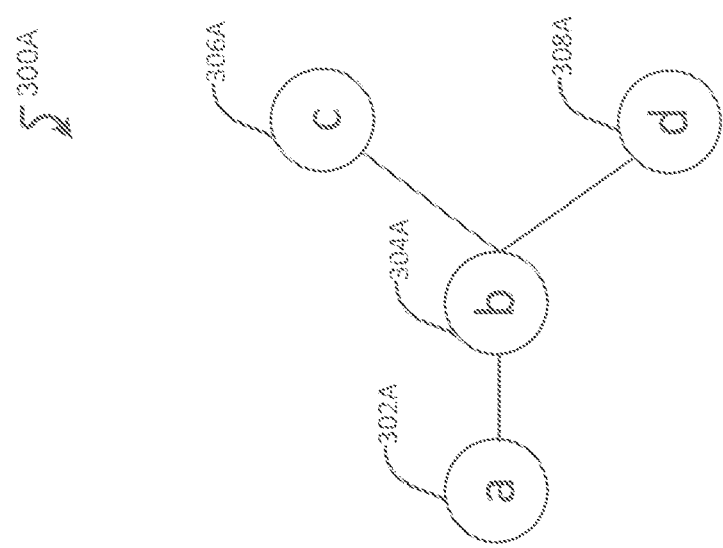
Figure 3B:
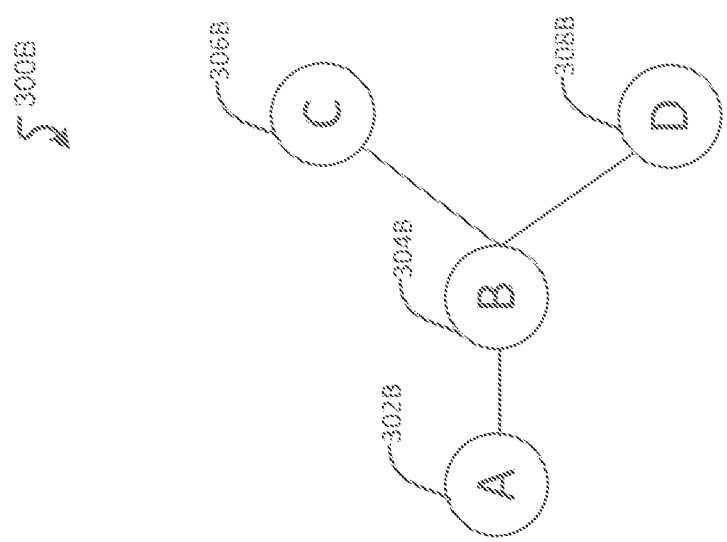
Figure 3C:
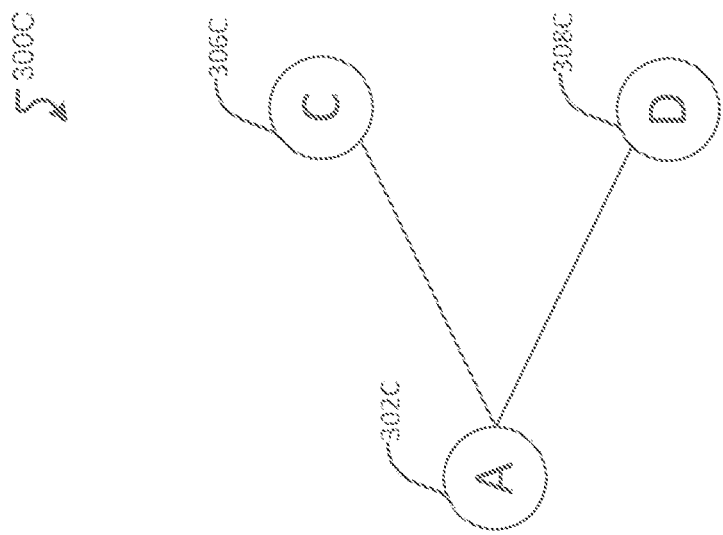

FIGS. 3A-C illustrate examples of inter-regional WANs in accordance with the aspects of the present disclosure. FIG. 3A illustrates an example of a physical topology of a network with four optical connection terminals at respective regional server centers connected by optical fiber wires. In aspects, optical connection terminal 302A connects with optical connection terminal 304A. Optical connection terminal 304A connects with optical connection terminal 306A and optical connection terminal 308A. In aspects, point-to-point optical fiber networks terminate at respective optical connection terminals in respective regional server centers.

FIG. 3B illustrates an example of an IP layer topology for the physical network in a point-to-point design from FIG. 3A. In aspects, optical connection terminals in FIG. 3A map to respective routers. The point-to-point optical fiber connection from the router 302B terminates at the router 302B on one end and the router 304B on the other end of the connection. The point-to-point optical fiber connection between the router 304B and the router 306B terminates at the router 304B on one end and the router 306B on the other end of the connection. Accordingly, the inter-regional data traffic between the router 302B and the router 306B passes through the router 304B and the OEO data conversion takes place.

FIG. 3C illustrates an example of an IP layer topology of the physical network where inter-regional data traffic between the router 302C and the router 306C optically bypasses a router (i.e., the router 304B shown in FIG. 3B). In FIG. 3C, an optical fiber connection is between the router 302C and the router 306C. Another optical fiber connection is between the router 302C and the router 308C. There is no OEO data conversion at the bypassed router (i.e., the router 304B in FIG. 3B). The inter-regional data traffic between the router 302C and the router 306C and the inter-regional data traffic between the router 302C and the router 308C optically bypasses the router (i.e., the router 304B shown in FIG. 3B).

Since wavelengths undergo conversion to electrical signals at every region in a point-to-point WAN, traffic from one region can be IP routed to any other region in the network. This flexibility in the traditional WAN based on the point-to-point regional topology allows the network to meet new and emerging traffic demands between regional server centers without requiring any changes to the optical backbone between the two regional server centers. The optical and IP topology of the network bear close resemblance. Each optical terminal maps to an IP router and fiber connections between neighboring regional server centers underpin the IP links between the corresponding routers. Enabling optical bypass can hamper the ability of certain regions from being the origin or destination of traffic. In an extreme case, a regional server center (e.g., the router 304B in FIG. 3B) could be bypassed entirely by all optical wavelengths.

The present disclosure determines an optical bypass (e.g., the optical bypass that bypasses the router) based on parameters including the optical bypass allocation information. The optical bypass allocation information include a data flow allocated over an inter-regional tunnel, a data flow allocation on respective optical fiber connections for the tunnel, a number of wavelengths (i.e., an optical bandwidth) on the optical bypass, and a data flow allocation on the optical bypass. The data flow allocation on the shortcut indicates an optical bandwidth allocated on an optical fiber connection associated with the optical bypass.

Figure 4B:
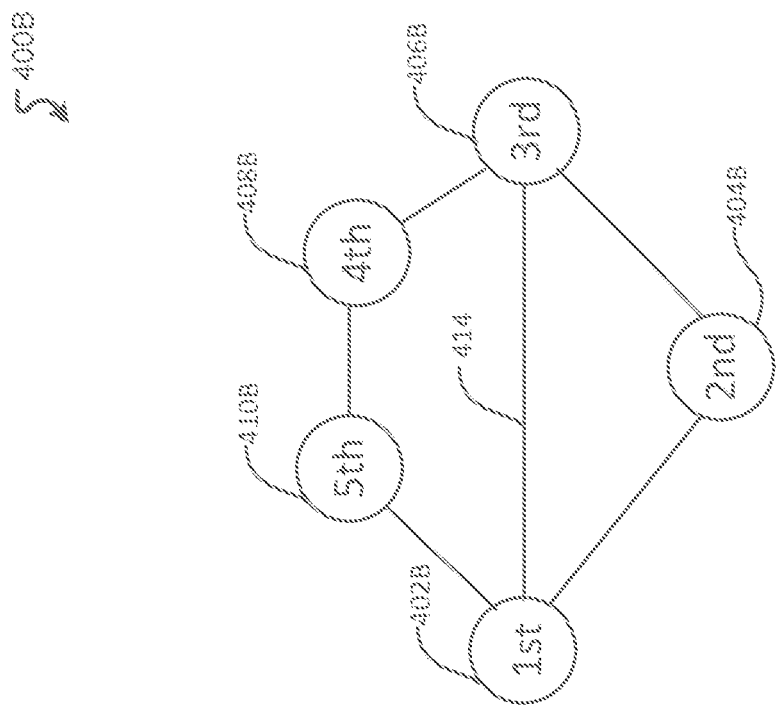
Figure 4A:
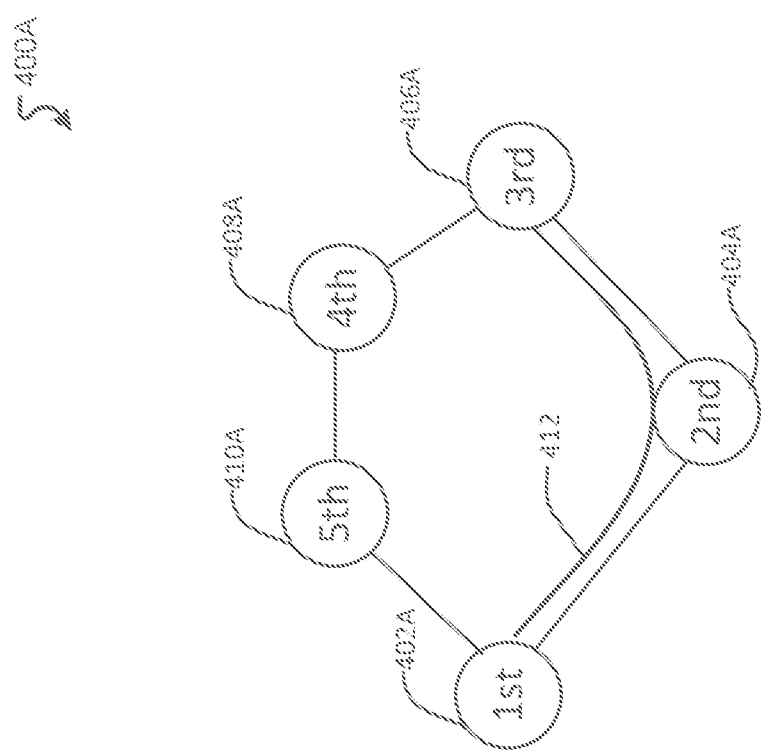

FIGS. 4A-B illustrate examples of a WAN topology in accordance of the aspects of the present disclosure. FIG. 4A illustrates an example of the physical network of the WAN topology in accordance of the aspects of the present disclosure. WAN 400A includes a first region 402A connecting with a second region 404A and a fifth region 410A. A third region 406A connects with the second region 404A and a fourth region 408A. A fifth region 410A connects with the fourth region 408A and the first region 402A. An optical bypass 412 connects the first region 402A and the third region 406A. The optical bypass 412 bypasses the second region 404A without using ports of a router at the second region 404A.

FIG. 4B illustrate an example of the IP network of the WAN topology from FIG. 4A in accordance of the aspects of the present disclosure. Similar to the WAN 400A in FIG. 4A, WAN 400B includes a first region 402B connecting with a second region 404B and a fifth region 410B. A third region 406B connects with the second region 404B and a fourth region 408B. The fifth region 410B connects with the fourth region 408B and the first region 402B. In the IP layer as shown in FIG. 4B, the optical bypass (e.g., the optical bypass 412 in FIG. 4A) forms an edge 414 in the IP-based WAN topology. The edge 414 directly connects the first region 402B with the third region 406B because the optical bypass creates a direct IP connection between the two regions.

In aspects, a space of potential optical bypasses is constrained by physical factors (e.g., signal quality and optical reach), traffic demands and network tunnels (or network pathways) over which they are routed. To effectively enumerate and determine potential optical bypasses, a graph abstraction of candidate network shortcuts (e.g., the edge 414 in FIG. 4B) may be generated based on one or more network tunnels (or network pathways) between two regional server centers. If viable in terms of balancing the network resources in the WAN, one or more of the candidate network shortcuts may be selected for physical reconfiguration as optical bypasses. A predicted network shortcut between one or more regions introduces a new edge in the corresponding IP network, which may be referred to as a bypass-induced edge. In aspects, a predicted network shortcut between regions A and C introduces a bypass-induced edge AC in the IP network. At the physical layer, the predicted network shortcut may be reconfigured as an optical bypass of region B by changing physical optical fiber connections between the terminal and router at region B. Higher layers of the network stack may then observe a direct connection between nodes A and C as a result of this physical reconfiguration. The disclosed technology defines one instance of optical bypass by physically reconfiguring a candidate network tunnel and its underlying fiber path.

FIG. 5 is an example of computationally determining an optical bypass in accordance of the aspects of the present disclosure. The determination 500 includes input 502, output 504, and computation 506. The computation 506 uses the input 502 and generates the output 504. The input includes network topology information. The network topology information includes vertices and edges. The input 502 further includes a capacity (or optical bandwidth) of each respective edge based on a number of wavelengths associated with the edge and a capacity per wavelength for each respective edge, a traffic demand between the source region and the destination region. The input 502 yet further includes a set of tunnels (i.e., a set of shortest point-to-point pathways between regions) determined based on the demand. As indicated above, the input 502 may also include one or more bypass induced edges (or candidate network shortcuts). The candidate network shortcuts may be identified based on one or more tunnels connecting non-adjacent regions. By evaluating the candidate network shortcuts as a respective edge using the computation 506, it may be determined whether candidate network shortcuts are viable as optical bypasses within the WAN.

The output 504 includes a flow of data traffic to be allocated on respective edges associated with respective tunnels between regions, which includes a number of wavelengths allocated on the candidate network shortcut and a predicted data flow allocation for the candidate network shortcut. A candidate network shortcut may be identified as a viable optical bypass based on viability in terms of balancing the network resource allocations (e.g., output 504 of the computation 506). Viable network shortcuts may then be physically reconfigured as optical bypasses within the WAN infrastructure.

The computation 506 includes a maximization using an objective function. In particular, the disclosed technology maximizes the number of router and optical ports that are freed by allocating wavelengths to network shortcuts. The OEO data conversion of each wavelength at a regional server center (e.g., hop) occupies a router port and optical port in both ingress and egress directions. Thus, a network shortcut allocated a predetermined number of wavelengths frees two sets of a router port and an optical port per wavelength at respective intermediate regional server centers.

The computation 506 further includes a set of conditions in maximizing a value of the objective function based on network demands and constraints from the existing inter-regional WAN. In aspects, the disclosed technology siphons as much of the traffic allocation between non-adjacent source and destination regions as possible to increase the number of wavelengths that can participate in an optical bypass. The combination of the siphoned flow and the flow on existing edges is predicted to meet the traffic demands between regions. Wavelengths on the network shortcuts are predicted to be sufficient in capacity to carry the siphoned flow on the network shortcut. By siphoning flow to the network shortcuts, the disclosed technology facilitates the conservation of network resources (e.g., router ports and transponder OEO processing) while meeting traffic demands.

A demand constraint (e.g., (1) in FIG. 5) provides that a sum of data flow allocated to all tunnels of the WAN network meets the overall traffic demand through the WAN. Flow conservation constraints (e.g., (2)-(4) in FIG. 5) provide that the flow allocated to a tunnel is carried either on the edges along the tunnel or network shortcuts along with tunnel. A wavelength constraint (e.g., (5) in FIG. 5) provides that the total flow siphoned off to a network shortcut is bounded by a capacity of the network shortcut. For example, when a network shortcut includes two wavelengths that can support 8-QAM modulation, the total flow siphoned to this network shortcut may be bounded by 300 Gbps. Capacity constraints (e.g., (6) and (7) in FIG. 5) provide that the total flow on edges may correspond to a sum of allocations across all tunnels. A bi-directional equality constraint (e.g., (8) in FIG. 5) provides that connections in an optical network assume bi-directional data flow. In aspects, an equal number of wavelengths may be allocated to the network shortcuts and respective sibling shortcuts in the reverse flow of data traffic.

Figure 6:
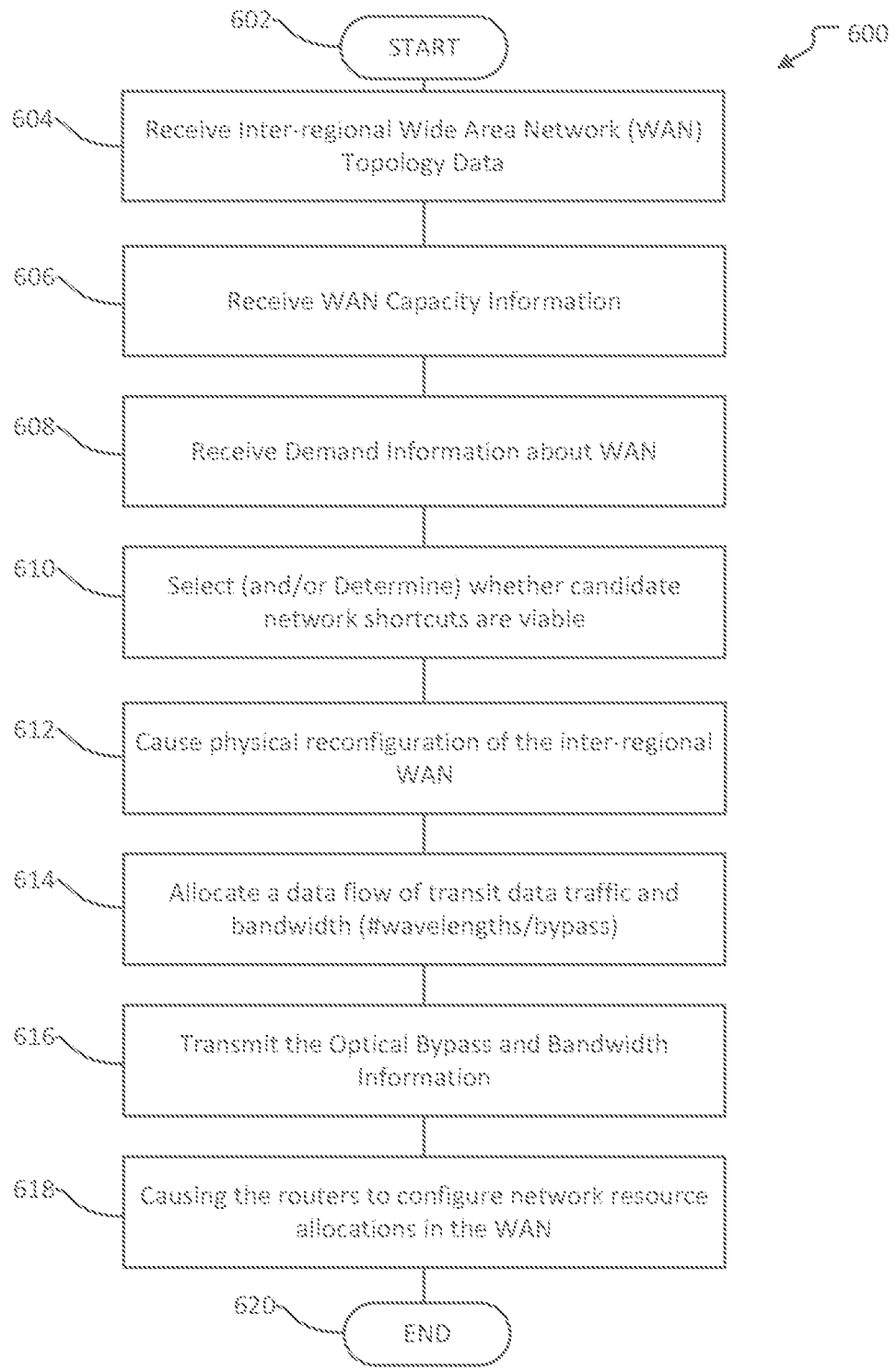
FIG. 6 illustrates an example of a method for determining an optical bypass in an inter-regional optical network in accordance with aspects of the present disclosure

FIG. 6 is an example of a method for determining an optical bypass in accordance with aspects of the present disclosure. A general order of the operations for the method 600 is shown in FIG. 6. Generally, the method 600 begins with start operation 602 and ends with end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2A-B, 3A-C, 4, 5, 7, and 8A-B.

Following start operation 602, the method 600 begins with receive operation 604, which receives an inter-regional WAN topology data. In aspects, the receive operation 602 and subsequent operations of the method 600 may take place off-line using statistical data of network usage and demands for capacities of the network traffic.

Receive operation 606 receives the WAN capacity information. The WAN capacity information includes one or more of capacities of respective edges of the WAN for an allocated number of wavelengths and capacities of each wavelength for the respective edges. In aspects, an edge represents a point-to-point optical fiber connection between two regional server centers.

Receive operation 608 receives historical demand information about the WAN. In aspects, the historical demand information includes a data traffic demand between a source region (i.e., a regional server center) and a destination region. The historical demand information may further include traffic demand associated with a set of tunnels connecting at least the source region and the destination region. In aspects, a tunnel represents a network pathway for data traffic between the source region and the destination region. A candidate network shortcut may be associated with a predicted demand associated with one or more tunnels associated with the network shortcut. A predicted data flow allocation for the candidate network shortcut may be based on the predicted demand, a capacity of the respective underlying tunnels based on an allocated number of wavelengths, and a capacity per wavelength for respective tunnels.

Select operation 610 selects and/or determines, based on a combination of the topological information of the WAN and the predicted data flow allocation for candidate network shortcuts, whether one or more candidate network shortcuts are viable for physically reconfiguring as optical bypasses. In aspects, the select operation 610 selects the candidate network shortcuts as optical bypasses to maximize the efficiency of network resource allocations while satisfying predicted data traffic demands in the inter-regional WAN.

Cause operation 612 causes physical reconfiguration of tunnels in the inter-regional WAN topology. In aspects, the physical reconfiguration is based on the selected one or more candidate network shortcuts.

Allocate operation 614 determines a data flow allocation of transit data traffic and an optical bandwidth (e.g., a number of wavelengths per optical bypass) information. The optical bandwidth information may include a number of wavelengths and a data traffic flow allocated for the optical bypass.

Transmit operation 616 transmits the determined data flow allocation of the transit data traffic, the optical bypass, and bandwidth to a network traffic configurator and enforcer. The network traffic configurator and enforcer may configure one or more routers on the WAN to reconfigure network resource allocations and transmit at least some transit data traffic over the optical bypass.

Cause operation 618 causes a network enforcer to reconfigure one or more routers and transponders at respective regional server centers. The network enforcer may allocate capacity and network resources. In aspects, the network traffic configurator and enforcer receive the transmitted information about the optical bypass and bandwidth allocations. The network enforcer may communicate with respective routers and transponders on the WAN, causing the respective routers and transponders to be reconfigured. The cause operation 616 further causes changes in physical configurations of the optical fiber wires in the WAN. The method 600 ends with the end operation 620.

As should be appreciated, operations 602-620 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
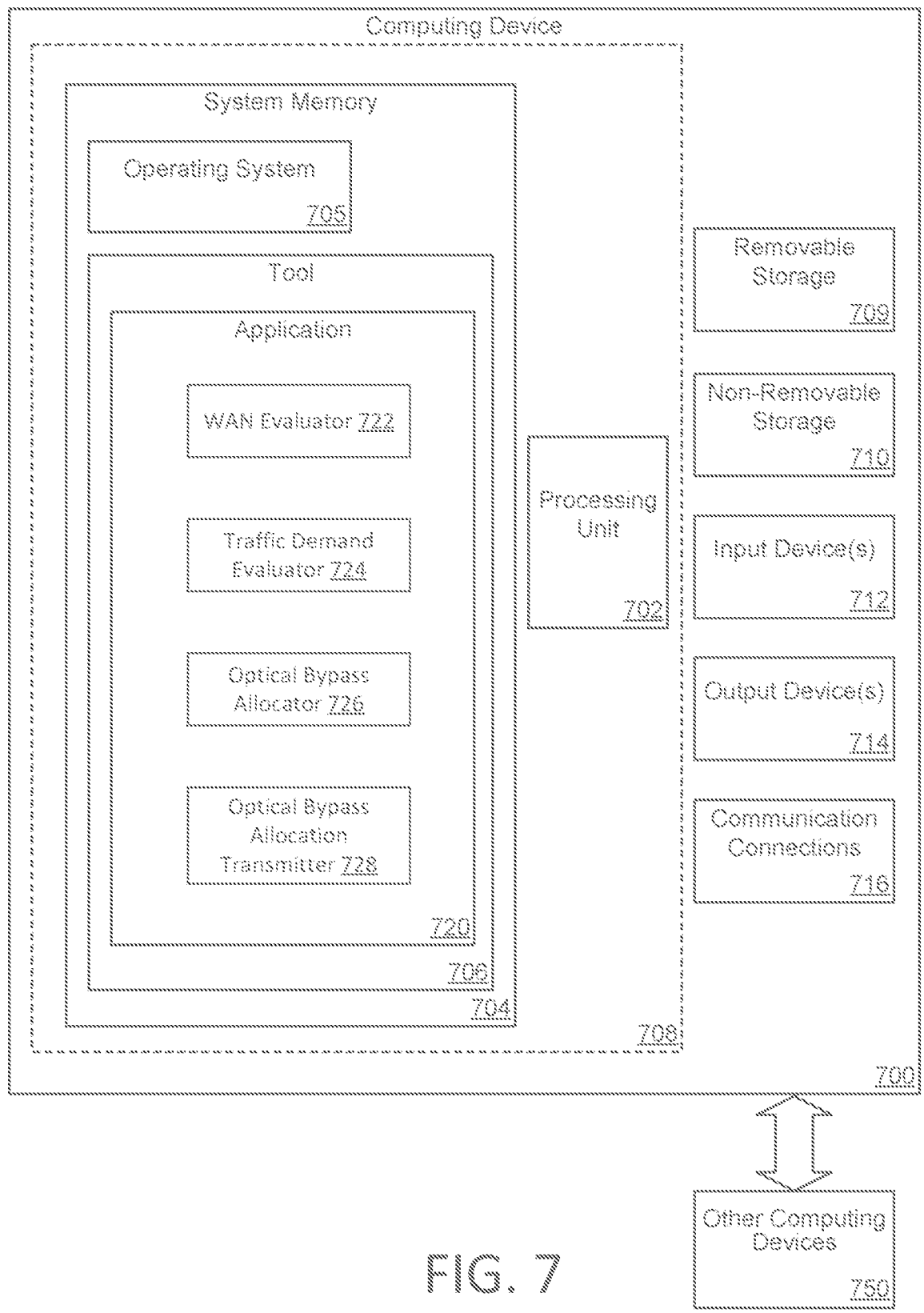
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a WAN evaluator 722, a traffic demand evaluator 724, an optical bypass allocator 726, and an optical bypass allocation transmitter 728, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
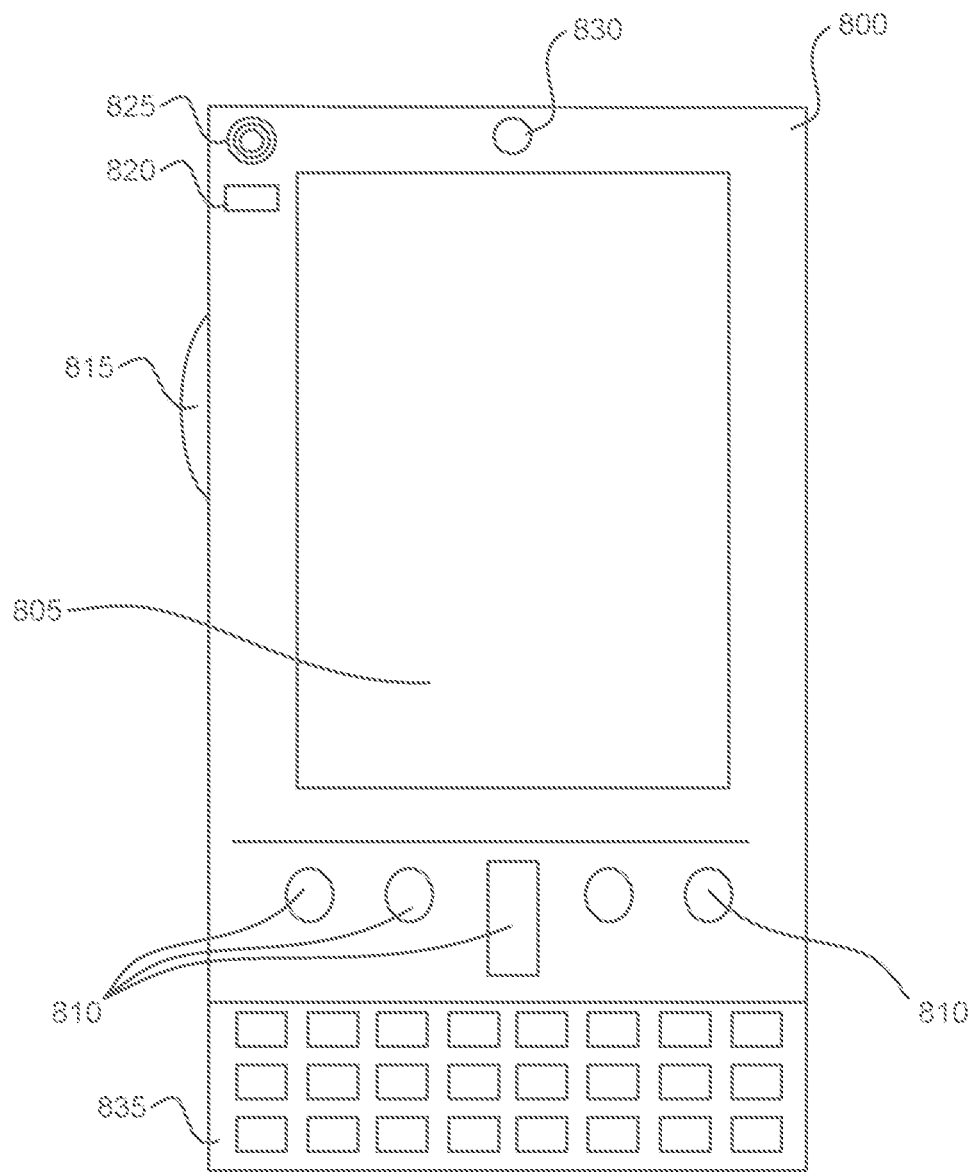
FIG. 8A is a simplified diagram of a mobile computing device with which aspects of the present disclosure may be practiced.
Figure 8B:
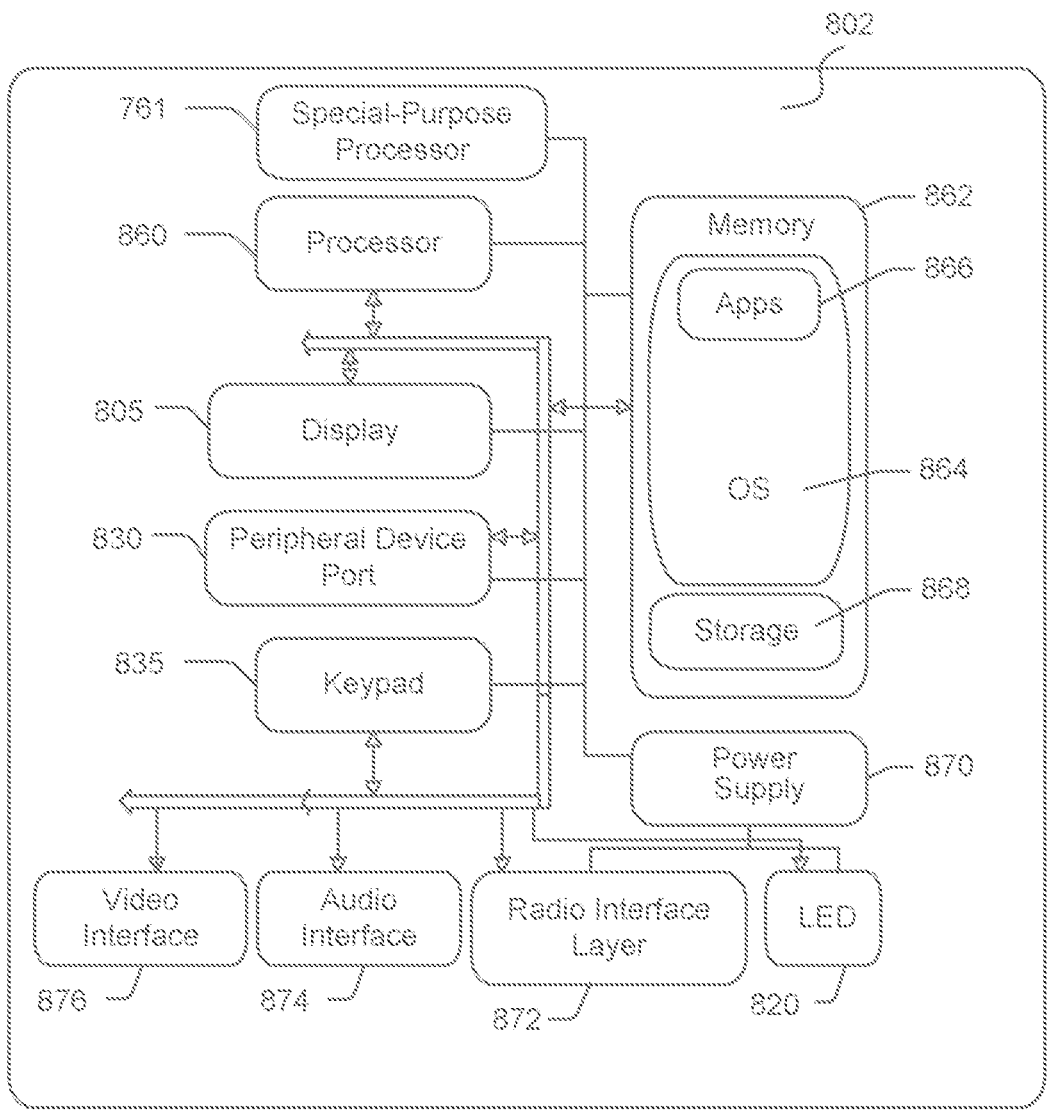
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of the WAN traffic enforcer 104 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the Optical Bypass Determiner 102 and the WAN Traffic Enforcer 104 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining an optical bypass between non-adjacent regions of an inter-regional wide area network (WAN) according to at least the examples provided in the sections below. The method comprises receiving inter-regional WAN topology data, wherein the topology data includes a plurality of network pathways between a first region and a second region, wherein the first region and the second region are non-adjacent within the WAN; receiving historical demand data for the WAN, wherein the historical demand data includes a historical data flow allocation for each of the plurality of network pathways between the first region and the second region; determining, based on the historical data flow allocation of the plurality of network pathways, a predicted data flow allocation for selecting a network shortcut, wherein the network shortcut comprises at least two of the plurality of network pathways and bypasses a third region between the first region and the second region; causing the network shortcut to be physically configured as the optical bypass; and based on at least the predicted data flow allocation, allocating a data flow of transit data traffic over the optical bypass between the first region and the second region, wherein the allocated data flow bypasses the third region. The method further comprises causing one or more routers on the WAN to reconfigure network resource allocations and transmit at least some transit data traffic over the optical bypass between the first region and the second region based on the allocated data flow. The WAN includes a set of point-to-point optical fiber network connections between at least the first region and the third region, and between at least the third region and the second region. The optical bypass corresponds to a point-to-point optical fiber connection between the first region and the second region, and wherein the third region includes a plurality of intermediate regions between the first region and the second region. The determining the predicted data flow allocation for the network shortcut includes maximizing an objective function, wherein the objective function optimizes a number of router ports and optical ports utilized for optical-electrical-optical (OEO) conversion at the third region based on redirecting data flow from the first region to the network shortcut. The optical bypass includes one or more amplifiers, wherein a distance of the optical bypass and a wavelength of the optical signals determine a number of amplifiers in the optical bypass. Determining the predicted data flow allocation satisfies one or more constraints, the one or more constraints including: a demand of data traffic between at least the first region and the second region of a set of regions associated with the WAN, a flow conservation, an optical bandwidth of the network shortcut, wherein the optical bandwidth corresponds to a rate of data transmission per wavelength of light through the network shortcut, and a bi-directional equality of the optical bandwidth of the network shortcut.

Another aspect of the technology relates to a system for determining an optical bypass between regions of an inter-regional wide area network (WAN). The system comprises a processor; and a memory storing computer-executable instructions that when executed by the processor cause the system to: receive inter-regional WAN topology data, wherein the topology data includes a plurality of network pathways between a first region and a second region, wherein the first region and the second region are non-adjacent within the WAN; receive historical demand data for the WAN, wherein the historical demand data includes a historical data flow allocation for each of the plurality of network pathways between the first region and the second region; determine, based on the historical data flow allocation of the plurality of network pathways, a predicted data flow allocation for selecting a network shortcut, wherein the network shortcut comprises at least two of the plurality of network pathways and bypasses a third region between the first region and the second region; cause the network shortcut to be physically configured as the optical bypass; and based on at least the predicted data flow allocation, allocate a data flow of transit data traffic over the optical bypass between the first region and the second region, wherein the allocated data flow bypasses the third region. The computer-executable instructions that when executed by the processor further cause the system to: cause one or more routers on the WAN to reconfigure network resource allocations and transmit at least some transit data traffic over the optical bypass between the first region and the second region based on the allocated data flow. The WAN includes a set of point-to-point optical fiber network connections between at least the first region and the third region, and between at least the third region and the second region. The optical bypass corresponds to a point-to-point optical fiber connection between the first region and the second region, and wherein the third region includes a plurality of intermediate regions between the first region and the second region. The determining the predicted data flow allocation for the network shortcut includes maximizing an objective function, wherein the objective function optimizes a number of router ports and optical ports utilized for optical-electrical-optical (OEO) conversion at the third region based on redirecting data flow from the first region to the network shortcut. The optical bypass includes one or more amplifiers, wherein a distance of the optical bypass and a wavelength of the optical signals determine a number of amplifiers in the optical bypass. The determining the predicted data flow allocation satisfies one or more constraints, the one or more constraints including: a demand of data traffic between at least the first region and the second region of a set of regions associated with the WAN, a flow conservation, an optical bandwidth of the network shortcut, wherein the optical bandwidth corresponds to a rate of data transmission per wavelength of light through the network shortcut, and a bi-directional equality of the optical bandwidth of the network shortcut.

In still further aspects, the technology relates to a computer-readable recording medium storing computer-executable instruction. The computer-readable recording medium when executed by a processor cause a computer system to receive inter-regional WAN topology data, wherein the topology data includes a plurality of network pathways between a first region and a second region, wherein the first region and the second region are non-adjacent within the WAN; receive historical demand data for the WAN, wherein the historical demand data includes a historical data flow allocation for each of the plurality of network pathways between the first region and the second region; determine, based on the historical data flow allocation of the plurality of network pathways, a predicted data flow allocation for selecting a network shortcut, wherein the network shortcut comprises at least two of the plurality of network pathways and bypasses a third region between the first region and the second region; cause the network shortcut to be physically configured as the optical bypass; and based on at least the predicted data flow allocation, allocate a data flow of transit data traffic over the optical bypass between the first region and the second region, wherein the allocated data flow bypasses the third region. The computer-executable instructions that when executed by the processor further cause the system to: cause one or more routers on the WAN to reconfigure network resource allocations and transmit at least some transit data traffic over the optical bypass between the first region and the second region based on the allocated data flow. The WAN includes a set of point-to-point optical fiber network connections between at least the first region and the third region, and between at least the third region and the second region. The optical bypass corresponds to a point-to-point optical fiber connection between the first region and the second region, and wherein the third region includes a plurality of intermediate regions between the first region and the second region. The determining the predicted data flow allocation for the network shortcut includes maximizing an objective function, wherein the objective function optimizes a number of router ports and optical ports utilized for optical-electrical-optical (OEO) conversion at the third region based on redirecting data flow from the first region to the network shortcut, and wherein the optical bypass includes one or more amplifiers, wherein a distance of the optical bypass and a wavelength of the optical signals determine a number of amplifiers in the optical bypass. The determining the predicted data flow allocation satisfies one or more constraints, the one or more constraints including: a demand of data traffic between at least the first region and the second region of a set of regions associated with the WAN, a flow conservation, an optical bandwidth of the network shortcut, wherein the optical bandwidth corresponds to a rate of data transmission per wavelength of light through the network shortcut, and a bi-directional equality of the optical bandwidth of the network shortcut.

Any of the one or more above aspects in combination with any other of the one or more aspect. Any of the one or more aspects as described herein.

What is claimed is:

1. A computer-implemented method for determining an optical bypass between non-adjacent regions of an inter-regional wide area network (WAN) with a plurality of pathways between regions of the WAN, the method comprising:

selecting, based on historical data flow allocation of a plurality of network pathways between a first region and a second region, a predicted data flow allocation associated with at least one network shortcut, wherein the first region and the second region are non-adjacent regions within the WAN, and wherein the at least one network shortcut comprises at least two of the plurality of network pathways and bypasses at least one region between the first region and the second region;

causing the at least one network shortcut to be physically configured as the optical bypass; and allocating a data flow of transit data traffic over the optical bypass between the non-adjacent regions, wherein the allocated data flow bypasses the at least one region.

2. The computer-implemented method of claim 1, the method further comprising:

causing one or more routers on the WAN to reconfigure network resource allocations and transmit at least some transit data traffic over the optical bypass between the first region and the second region based on the allocated data flow.

3. The computer-implemented method of claim 1, further comprising:

receiving inter-regional WAN topology data, wherein the inter-regional WAN topology data includes the plurality of network pathways between the first region and the second region; and receiving historical demand data for the WAN, wherein the historical demand data includes the historical data flow allocation for each of the plurality of network pathways between the first region and the second region, wherein the WAN includes a set of point-to-point optical fiber network connections between at least the first region and the at least one region, and between at least the at least one region and the second region.

4. The computer-implemented method of claim 1, wherein the optical bypass corresponds to a point-to-point optical fiber connection between the first region and the second region, and wherein the at least one region includes a plurality of intermediate regions between the first region and the second region.

5. The computer-implemented method of claim 1, wherein the selecting the predicted data flow allocation for the network shortcut includes maximizing an objective function, wherein the objective function optimizes a number of router ports and optical ports utilized for optical-electrical-optical (OEO) conversion at a third region based on redirecting data flow from the first region to the network shortcut.

6. The computer-implemented method of claim 1, wherein the optical bypass includes one or more amplifiers, wherein a distance of the optical bypass and a wavelength of optical signals associated with the optical bypass determine a number of amplifiers in the optical bypass.

7. The computer-implemented method of claim 1, wherein selecting the predicted data flow allocation satisfies one or more constraints, the one or more constraints including:
   a demand of data traffic between at least the first region and the second region of a set of non-adjacent regions associated with the WAN,
   a flow conservation,
   an optical bandwidth of the network shortcut, wherein the optical bandwidth corresponds to a rate of data transmission per wavelength of light through the network shortcut, and
   a bi-directional equality of the optical bandwidth of the network shortcut.

8. A system for determining an optical bypass between regions of an inter-regional wide area network (WAN), the system comprising:
   a processor; and
   a memory storing computer-executable instructions that when executed by the processor cause the system to:
      selecting, based on historical data flow allocation of a plurality of network pathways between a first region and a second region, a predicted data flow allocation associated with at least one network shortcut, wherein the first region and the second region are non-adjacent regions within the WAN, and wherein the at least one network shortcut comprises at least two of the plurality of network pathways and bypasses at least one region between the first region and the second region;
      cause the at least one network shortcut to be physically configured as the optical bypass; and
      allocate a data flow of transit data traffic over the optical bypass between the non-adjacent regions, wherein the allocated data flow bypasses the at least one region.

9. The system of claim 8, the computer-executable instructions that when executed by the processor further cause the system to:
   cause one or more routers on the WAN to reconfigure network resource allocations and transmit at least some transit data traffic over the optical bypass between the first region and the second region based on the allocated data flow.

10. The system of claim 8, further comprising:
   receiving inter-regional WAN topology data, wherein the inter-regional WAN topology data includes the plurality of network pathways between the first region and the second region; and
   receiving historical demand data for the WAN, wherein the historical demand data includes the historical data flow allocation for each of the plurality of network pathways between the first region and the second region,
   wherein the WAN includes a set of point-to-point optical fiber network connections between at least the first region and the at least one region, and between at least the at least one region and the second region.

11. The system of claim 8, wherein the optical bypass corresponds to a point-to-point optical fiber connection between the first region and the second region, and wherein the at least one region includes a plurality of intermediate regions between the first region and the second region.

12. The system of claim 8, wherein the selecting the predicted data flow allocation for the network shortcut includes maximizing an objective function, wherein the objective function optimizes a number of router ports and optical ports utilized for optical electrical-optical (OEO) conversion at a third region based on redirecting data flow from the first region to the network shortcut.

13. The system of claim 8, wherein the optical bypass includes one or more amplifiers, wherein a distance of the optical bypass and a wavelength of optical signals associated with the optical bypass determine a number of amplifiers in the optical bypass.

14. The system of claim 8, wherein the selecting the predicted data flow allocation satisfies one or more constraints, the one or more constraints including:
   a demand of data traffic between at least the first region and the second region of a set of non-adjacent regions associated with the WAN,
   a flow conservation,
   an optical bandwidth of the network shortcut, wherein the optical bandwidth corresponds to a rate of data transmission per wavelength of light through the network shortcut, and
   a bi-directional equality of the optical bandwidth of the network shortcut.

15. A computer-readable recording medium storing computer-executable instructions that when executed by a processor cause a computer system to:
   selecting, based on historical data flow allocation of a plurality of network pathways between a first region and a second region, a predicted data flow allocation associated with at least one network shortcut, wherein the first region and the second region are non-adjacent regions within an inter-regional wide area network (WAN), and wherein the at least one network shortcut comprises at least two of the plurality of network pathways and bypasses at least one region between the first region and the second region;
   cause the at least one network shortcut to be physically configured as an optical bypass; and
   allocate a data flow of transit data traffic over the optical bypass between the non-adjacent regions, wherein the allocated data flow bypasses the at least one region.

16. The computer-readable recording medium of claim 15, the computer-executable instructions that when executed by the processor further cause the computer system to:
   cause one or more routers on the WAN to reconfigure network resource allocations and transmit at least some transit data traffic over the optical bypass between the first region and the second region based on the allocated data flow.

17. The computer-readable recording medium of claim 15, the computer-executable instructions that when executed by the processor further cause the computer system to:

receive inter-regional WAN topology data, wherein the inter-regional WAN topology data includes the plurality of network pathways between the first region and the second region; and receive historical demand data for the WAN, wherein the historical demand data includes the historical data flow allocation for each of the plurality of network pathways between the first region and the second region, wherein the WAN includes a set of point-to-point optical fiber network connections between at least the first region and the at least one region, and between at least the at least one region and the second region.

18. The computer-readable recording medium of claim 15, wherein the optical bypass corresponds to a point-to-point optical fiber connection between the first region and the second region, and wherein the at least one region includes a plurality of intermediate regions between the first region and the second region.

19. The computer-readable recording medium of claim 15, wherein the selecting the predicted data flow allocation for the network shortcut includes maximizing an objective function, wherein the objective function optimizes a number of router ports and optical ports utilized for optical-electrical-optical (OEO) conversion at the at least one region based on redirecting data flow from the first region to the network shortcut, and wherein the optical bypass includes one or more amplifiers, wherein a distance of the optical bypass and a wavelength of optical signals associated with the optical bypass determine a number of amplifiers in the optical bypass.

20. The computer-readable recording medium of claim 15, wherein the determining the predicted data flow allocation satisfies one or more constraints, the one or more constraints including:

a demand of data traffic between at least the first region and the second region of a set of non-adjacent regions associated with the WAN, a flow conservation, an optical bandwidth of the network shortcut, wherein the optical bandwidth corresponds to a rate of data transmission per wavelength of light through the network shortcut, and a bi-directional equality of the optical bandwidth of the network shortcut.

* * * * *